(12) United States Patent
Ziegler et al.

(10) Patent No.: US 11,085,879 B1
(45) Date of Patent: Aug. 10, 2021

(54) FOG TESTER

(71) Applicant: U.S. Government as Represented by the Secretary of the Army, Natick, MA (US)

(72) Inventors: David Ziegler, Clinton, MA (US); Gary Proulx, Harrisville, RI (US); Stephen Giardini, Framingham, MA (US)

(73) Assignee: U.S. Government as Represented by the Secretary of the Army, Washington, DC (US)

(*) Notice: Subject to any disclaimer, the term of this patent is extended or adjusted under 35 U.S.C. 154(b) by 0 days.

(21) Appl. No.: 16/848,229

(22) Filed: Apr. 14, 2020

Related U.S. Application Data

(60) Provisional application No. 62/833,900, filed on Apr. 15, 2019.

(51) Int. Cl.
*G01N 21/59* (2006.01)
*G01N 21/958* (2006.01)
*G01N 21/956* (2006.01)

(52) U.S. Cl.
CPC .......... *G01N 21/59* (2013.01); *G01N 21/956* (2013.01); *G01N 21/958* (2013.01); *G01N 2021/9583* (2013.01)

(58) Field of Classification Search
CPC .... G01N 21/59; G01N 21/956; G01N 21/958; G01N 2021/9583
USPC .................................................. 356/432–448
See application file for complete search history.

(56) References Cited

U.S. PATENT DOCUMENTS

| | | | |
|---|---|---|---|
| 6,559,939 B1 | 5/2003 | Saunders | |
| 7,320,261 B1 | 1/2008 | Hockaday et al. | |
| 7,538,800 B1 | 5/2009 | Caretti et al. | |
| 8,365,619 B2 | 2/2013 | Ziegler et al. | |
| 9,064,445 B2 | 6/2015 | Kobayashi | |

*Primary Examiner* — Tri T Ton
(74) *Attorney, Agent, or Firm* — Roger C. Phillips

(57) ABSTRACT

An apparatus configured to fog test eyewear includes an environmentally controlled chamber, a head form disposed within the chamber, a radiator disposed within the chamber, the radiator connected to a liquid cooling system, and a humidifier device configured to deliver a flow of warm moist air towards the frontal portion of the head form and a surface of the eyewear. A camera is disposed within the head form, the camera aligned with a first opening in a frontal portion of the head form and configured to detect a target image within the chamber while the flow of warm moist air is delivered. A processor is configured to calculate a contrast difference between a background of the target image detected by the camera and resolution bars of the target image detected by the camera, plot a contrast ratio from the calculated contrast difference against a known calibration standard and calculate a performance measure of an anti-fog device of the eyewear.

6 Claims, 10 Drawing Sheets

US 11,085,879 B1

FOG TESTER

CROSS-REFERENCE TO RELATED APPLICATIONS

This application claims the benefit of prior U.S. Provisional Patent Application Ser. No. 62/833,900, filed on Apr. 15, 2019, the disclosure of which is incorporated herein by reference in its entirety.

STATEMENT OF GOVERNMENT INTEREST

The invention described herein may be manufactured and used by the United States Government for governmental purposes without the payment of any royalty thereon.

BACKGROUND OF THE INVENTION

1. Field

The aspect of the disclosed embodiments generally relate to testing the performance and effectiveness of passive and active eyewear lens anti-fog devices.

2. Description of the Prior Art

Fogging of eyewear or other eye protection devices, which can include but is not limited to spectacles, goggles and faceshields, is a common problem. A typical anti-fog solution generally involves a carrier frame ventilation solution. Current test methods to evaluate such anti-fog solutions typically include positioning the lens or lenses of such eyewear over a heated water bath and measuring a time needed to obscure the lens, or a time for light transmission through the lens to decrease. For the purposes of the discussion herein, the lens or lenses of such eyewear will be referred to as a "lens", it being understood that there can be one or more lenses in such eyewear or eye protection devices.

Current test standards work with passive anti-fog methods and devices, generally referred to herein as anti-fog solutions. Newer anti-fog solutions include using powered electronics and sensors to trigger the clearing of the lenses of such eyewear. Examples of such newer anti-fog solutions can include, but are not limited to, heated lenses, electrowetting driven clearing lenses, and ultrasonic repulsion and drying types of lenses. These advanced anti-fog solutions do not test effectively with current test methodologies for passive anti-fog devices.

Accordingly, there is a need for an improved test apparatus and method for measuring the effectiveness of anti-fog solutions for eyewear lenses.

SUMMARY

The aspects of the disclosed embodiments are directed to an apparatus for testing the effectiveness of anti-fog solutions for eyewear lenses. This and further objectives are solved by the subject matter of the independent claims. Further advantageous embodiments can be found in the dependent claims.

According to a first aspect the above and further objectives and advantages are obtained by an apparatus configured to fog test eyewear. In one embodiment, the apparatus includes an environmentally controlled chamber, a head form disposed within the chamber, a radiator disposed within the chamber, the radiator connected to a liquid cooling system and a humidifier device configured to deliver a flow of warm moist air towards the frontal portion of the head form and a surface of the eyewear. A camera is disposed within the head form and is aligned with an opening in the frontal portion of the head form. The camera is configured to detect a target image within the chamber while the flow of warm moist air is delivered. A processor is configured to calculate a contrast difference between a background of the target image detected by the camera and resolution bars of the target image detected by the camera, plot a contrast ratio from the calculated contrast difference against a known calibration standard and calculate a performance measure of an anti-fog device of the eyewear. Computer vision analysis of a standard image target allows automated empirical testing. Calibration against existing BYK Gardner Haze standards correlate with known eyewear performance from previous generation NSRDEC Fog Testers. Additionally, a fog tester apparatus using a video camera through the eye significantly reduces cost.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DESCRIPTION OF THE PREFERRED EMBODIMENTS

Figure 1:
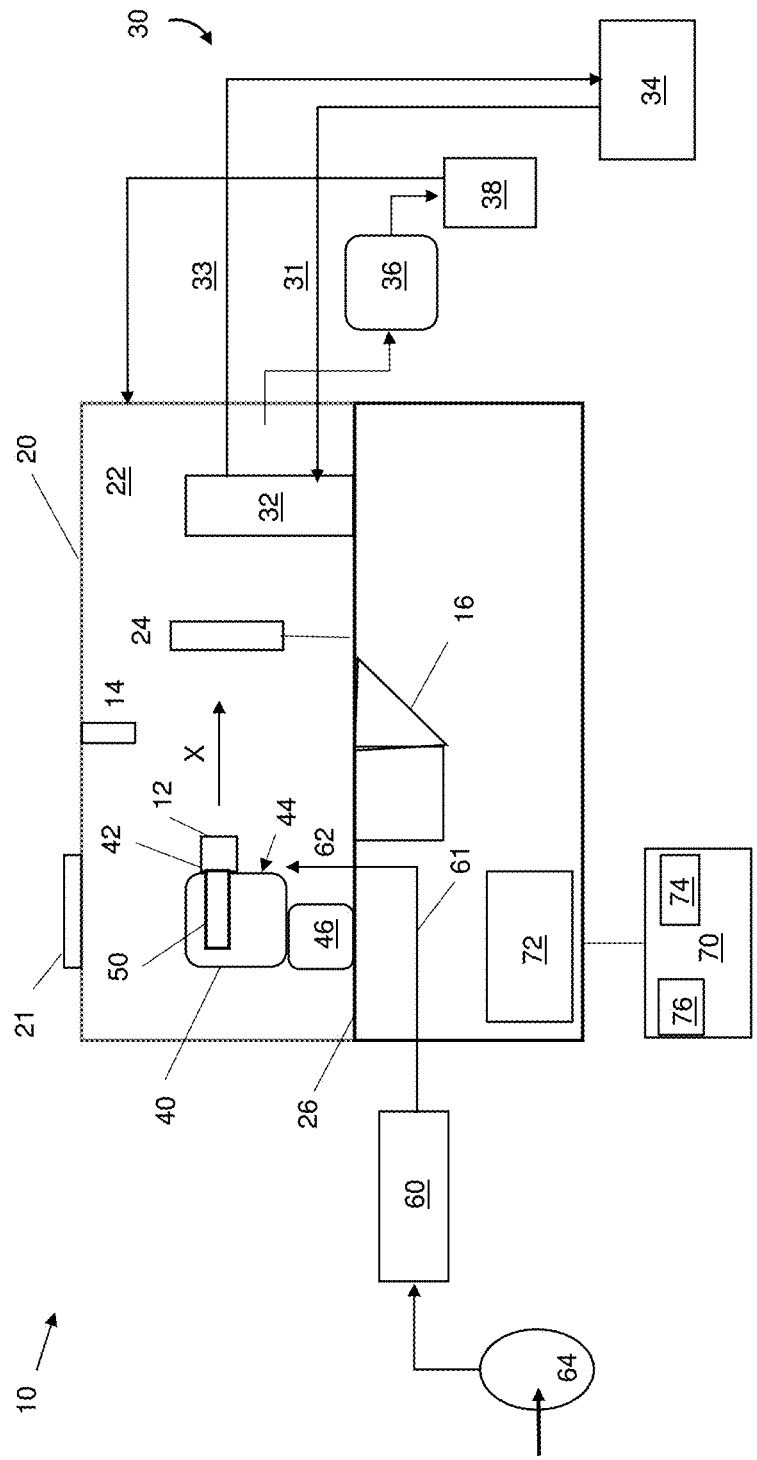
FIG. 1 is a schematic block diagram of an apparatus incorporating aspects of the disclosed embodiments.

FIG. 1 illustrates an exemplary apparatus 10 incorporating aspects of the disclosed embodiments. The apparatus 10 is configured to test and evaluate the effectiveness of anti-fogging solutions for eyewear. The term "solutions" as is used herein is intended to encompass both passive and active methods and devices that are directed to anti-fogging of eyewear. By using an imaging device or camera, the aspects of the disclosed embodiments can use image analysis to effectively test the efficacy of anti-fog solutions for eyewear.

The term "eyewear", as is generally used herein, is intended to include any eyewear configured to be worn by a user that is susceptible to fogging. Examples of such eyewear can include, but are not limited to, glasses, protective eyewear, goggles, spectacle, face masks and face shields. Also included are any types of protection or protective devices that are configured to provide eye and facial protection from projectiles and fragments, sand, dust, debris and solar glare. Some specific examples of such eyewear can include, but are not limited to, Product Manager-Soldier Protective Equipment (PM-SPE) responsible for the Army Approved Protective Eyewear List (APEL) of eyewear products that meet Army safety requirements. Also included are PM-SPE Laser Eye Protection (LEP) specific protective eyewear.

For purposes of the description herein, the eyewear may also be referred to as "lens" or "lenses", without intending to limit the scope of the disclosed embodiments. It will be understood that in some cases, eyewear may include a single lens or faceshield, while in other implementations, the eyewear can include more than one lens, referred to as lenses. The apparatus 10 according to the aspects of the disclosed embodiments can be configured to accommodate any suitable number of lenses for a particular eyewear type or implementation.

In one embodiment, the eyewear of the disclosed embodiments can include active anti-fog solutions rather than passive anti-fog solutions, or a combination thereof. Passive anti-fog solutions will generally include carrier frame ventilation solutions. Examples of active anti-fog solutions can include, but are not limited to, heated lenses, electro-wetting driven clearing solutions and ultrasonic repulsion/drying solutions.

As shown in FIG. 1, the apparatus 10 includes a chamber 20. In one embodiment, the chamber 20 is an environmentally controlled chamber. A head form 40 is disposed within the chamber 20 and a camera 50 is mounted within the head form 40. In one embodiment, an image detector of the camera 50 is aligned with an opening 42 in the head form 40. The opening 42 is in a frontal portion 44 of the head form 40, and generally comprises an area where a person's eye is located. The camera 50 is configured to detect a target image 24 that is disposed within the chamber 20.

In the example of FIG. 1, a temperature and humidity control assembly 30 is configured to maintain the chamber 20 at a selected temperature and relative humidity. In one embodiment, the temperature and humidity control assembly 30 includes a radiator 32 and a liquid cooling system 34. The radiator 32 is disposed within the chamber 20 and is connected to a liquid cooling system 34. In the example of FIG. 1, the liquid cooling system 34 is shown external to the chamber 20 and is connected to the radiator 32 by a supply 31 and a return 33. In alternate embodiments, the liquid cooling system 34 can be disposed in any suitable location. A controller, such as the computing device 70, can be coupled or connected to the temperature and humidity control assembly 30 and used to control the temperature and relative humidity. As will be described further herein, the temperature and relative humidity of the chamber 20 is maintained in a controlled manner.

A humidifier device 60 is connected to the chamber 20. The humidifier device 60 is configured to deliver a flow 62 of warm moist air towards the frontal portion 44 of the head form 40. The flow 62 of warm moist air is configured to cause a fogging of a surface of the eyewear 12 under test. A supply tube or other suitable conduit 61 can be used to deliver the flow 62 of warm moist air. A fan or blower unit 64 is coupled to the humidifier device 60 and can be used to generate the flow 62. In one embodiment, the computing device 70 is coupled to humidifier device 60 and blower 64 in order to control its operation.

The apparatus 10 also includes the computing device 70. The computing device 70 is configured to control the chamber 10, and the devices that are connected to or in operation with respect to the chamber 10. In one embodiment, the computing device 70 is configured to receive the images or video feed captured by the camera 50. The computing device 70 can be configured to calculate a contrast difference between a background image and resolution bars of the target image 24, as detected by the camera 50. The computing device 70 is further configured to plot a contrast ratio from the calculated contrast difference against a known calibration standard and calculate a performance measure of the anti-fog device of the eyewear 12 under test.

The aspects of the disclosed embodiments enable the test eyewear 12 to be evaluated in the as-worn position. Using the camera 50, image analysis facilitates the evaluation of active anti-fog technologies that may require gravity to help clear the visual field of view or cannot with stand testing conditions as described in existing test standards, such as ASTM F659 Annex 1, ANSI Z-87, or EN168, for example.

The test chamber 20 is configured as an environmentally controlled chamber. During use, the test chamber 20 is configured to be closed or sealed. In one embodiment, the chamber 20 can include an access door or port 21 that can allow access to the interior 22 of the chamber 20 as needed. Although the access door 21 is shown on a top of the chamber 20, the aspects of the disclosed embodiments are not so limited. In alternate embodiments, the access door 21 can be located at any suitable location with respect to the chamber 20.

The apparatus 10 comprises one or more devices that can be used to maintain the environmental conditions of the chamber 20 at preset or predetermined levels and facilitate the testing in accordance with the aspects of the disclosed embodiments. As shown in FIG. 1, the radiator 32 of the temperature and humidity control assembly 30 is configured to receive a supply of temperature controlled fluid from the liquid cooling system or apparatus 34. The liquid cooling system 34 can include a chilled water bath or water chiller, for example. The radiator 32, in conjunction with the liquid cooling apparatus 34, is configured to maintain the interior 22 of the chamber 20 at a consistent, or steady temperature and humidity level for testing purposes.

In one embodiment, a test temperature of the interior 22 of the chamber 20 is configured to been maintained in a range of approximately 5° Celsius to and including 15° Celsius. A preferred testing temperature in this range is 6° Celsius. In alternate embodiments, the temperature of the interior 22 of the chamber 20 during testing can be maintained at any suitable or desired temperature, other than including 6° Celsius.

In one embodiment, a relative humidity of less than 30% can be maintained in the chamber 20. As is shown in FIG. 1, the radiator 32 is connected via suitable supply and return connections 31, 33 to the liquid cooling apparatus 34 to form a closed liquid cooling system that is used to maintain the environmental chamber 20 at the desired testing temperature and relative humidity levels. Although the term "cooling" is used herein with respect to the apparatus 34, the aspects of the disclosed embodiments are not so limited. In one embodiment, the apparatus 34 can be used to warm the interior 22 of the chamber to the desired temperature.

In one embodiment, the apparatus 10 and system 30 can include an air pump or blower 36 and desiccant columns 38. As illustrated in FIG. 1, the air pump 36 is configured to circulate air within the chamber 20. The air pump 36 is configured to assist with the removal of humid air from the chamber 20 by circulating the air through the desiccant columns 36. The circulation of the air through the desiccant columns 36 is configured to remove moisture in the air. The air pump 36 is then configured to force the air back into the chamber 20.

In one embodiment, the humidifier device 60 comprises a warm water bath or bubbler. As shown in FIG. 1, the humidifier device 60 is configured to deliver a flow or stream of warm moist air 62 to or within the chamber 20. In particular, the flow 62 of warm moist air from the humidifier device 60 is configured to be directed towards the test eyewear 12. Generally, the flow 62 of warm moist air is configured to be directed to the test eyewear 12 in a manner that will cause fogging of the lens surfaces of the test eyewear 12. As will be further described below, during testing, the rear surfaces of the eyewear 12, or the surfaces of the lenses of the eyewear 12 that would be closest to the user's face are maintained in a warm moist condition. The front surfaces of the eyewear 12 are maintained at the temperature and relative humidity within the chamber 20. This will promote fogging of the lens or lenses of the test eyewear 12.

A target or target image 24 is disposed within the interior 22 of the chamber 20. As illustrated in FIG. 1, the target image 24 is disposed in the viewing direction X relative to the front portion 44 of the head form 40. As will be described further with respect to FIG. 10, in one embodiment, the target image 24 includes a background 916 and resolution bars 912, 914. The camera 50 is configured to detect the background 916 and the resolution bars 912, 914, and the contrast therebetween, which can then be used to measure the effectiveness of the anti-fogging solution(s) of the test eyewear 12.

Figure 10:
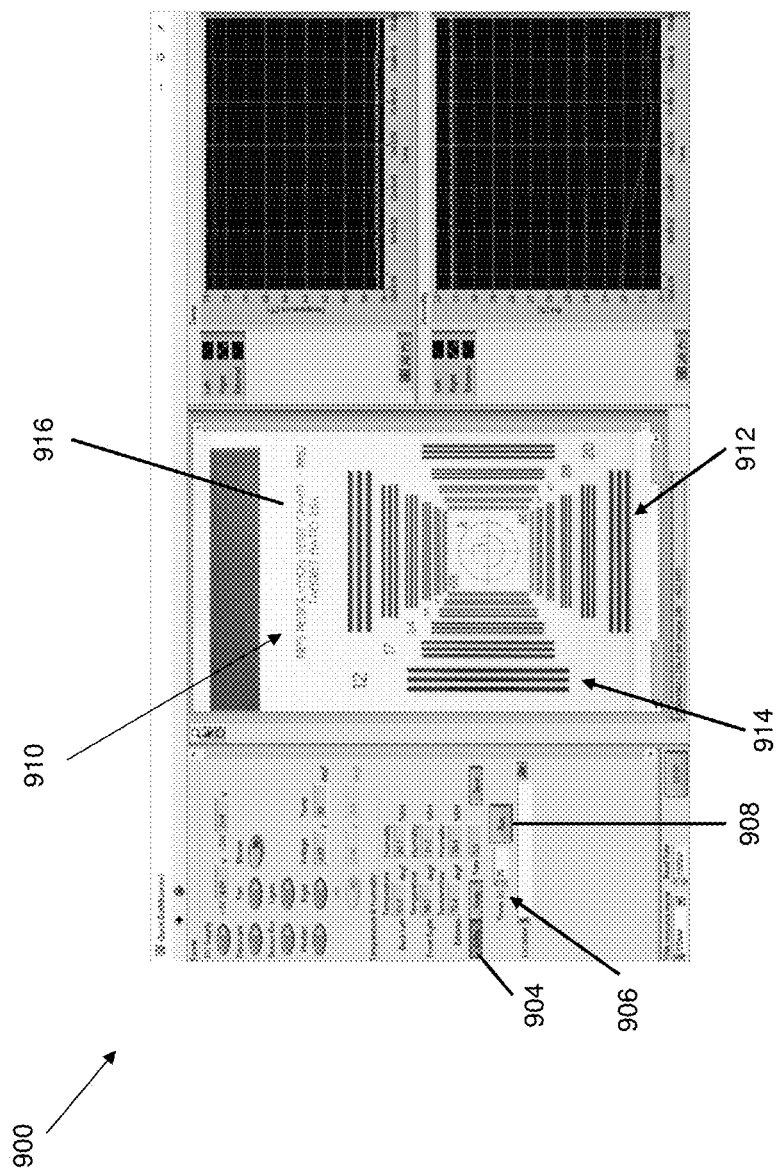
FIG. 10 illustrates an exemplary view of a target image as rendered in a computer application incorporating aspects of the disclosed embodiments.

FIG. 10 illustrates an exemplary view 910 of the target image 24, as viewed from images taken from the camera 50. As shown in FIG. 10, the view 910 of the target image 24 includes one or more sets of resolution bars 912, 914. In this example, the sets of resolution bars includes a horizontally oriented set of resolution bars 912 and a vertically oriented set of resolution bars 914. The analysis software described herein focuses upon these resolution bars 912, 914 and each set is associated with a sub image rectangle for the contrast ratio calculation.

The target image 24 also includes a background 916. In one embodiment, the background 916 is colored white and the resolution bars 912, 914 are colored black. In alternate embodiments, any suitable color combination and contrast can be used. The background 916 is configured to contrast with the sets of resolution bars 912, 914. As will be described further herein, the camera 50 is configured to capture images of the target image 24 while the eyewear 12 is fogged. A contrast difference between the background 916 and the resolution bars 912, 914 of the target image 24 is calculated and the contrast ratio is plotted from the calculated contrast difference against a known calibration standard. The performance measure of the anti-fog device of the eyewear 12 is then determined from the plot. In one embodiment, a passing performance is considered a contrast ratio score that stays below the interpolated 7% Haze standard. Commercially available Haze Standards are sold as 5% and 10% ratings, and thus an interpolation must be made for the previously determined 7% Haze failure point.

In one embodiment, the chamber 20 can include a lighting device 14. The lighting device 14 can comprise any suitable lighting device that is configured to illuminate the chamber 20. In one embodiment, the lighting device 14 is configured to provide uniform test chamber illumination, measured between 11 foot Candles (ftCd) and 16 ftCd, for example.

In one embodiment, the apparatus 10 can include a drop tray 16. The drop tray 16 is configured to provide extra space in front of the head form 40 to allow for testing of different types and sizes of eyewear 12.

In one embodiment, the apparatus 10 can include an electronics box 72. The electronics box 72 can be configured to house electrical control and electronics circuitry to interface with computer controls of the computing device 70 and the devices of the apparatus 10. Although an electronics box 72 is described herein, the aspects of the disclosed embodiments are not so limited. In one embodiment, the computing device 70 can be configured to connect directly with each of the components and devices of the apparatus 10, either through wired connections or wireless connections.

The computing device 70 is generally configured to control the operation of the apparatus 10 during testing of the eyewear 12. In one embodiment, the computing device 70 includes at least one processor 74 that is configured to execute non transitory machine readable instructions. The computing device 70 can also include at least one memory 76. The term "processor" as is used herein refers to an arrangement of at least one processing unit that is configured to perform the processing steps for fog testing eyewear in accordance with the aspects of the disclosed embodiments. The term "processor" generally refers to an application, program, process or device in a client-server relationship that responds to requests for information or services by another application, program, process or device (a client) on a communication network. The term "processor" also encompasses software that makes the act of serving information or providing services possible.

It will be appreciated that the processor 74 can be implemented in several ways. In one embodiment, the processor 74 comprises a single processing unit. In another embodiment, the processor comprises a plurality of processing units. In such a case, the plurality of processing units could have a distributed architecture.

Figure 2:
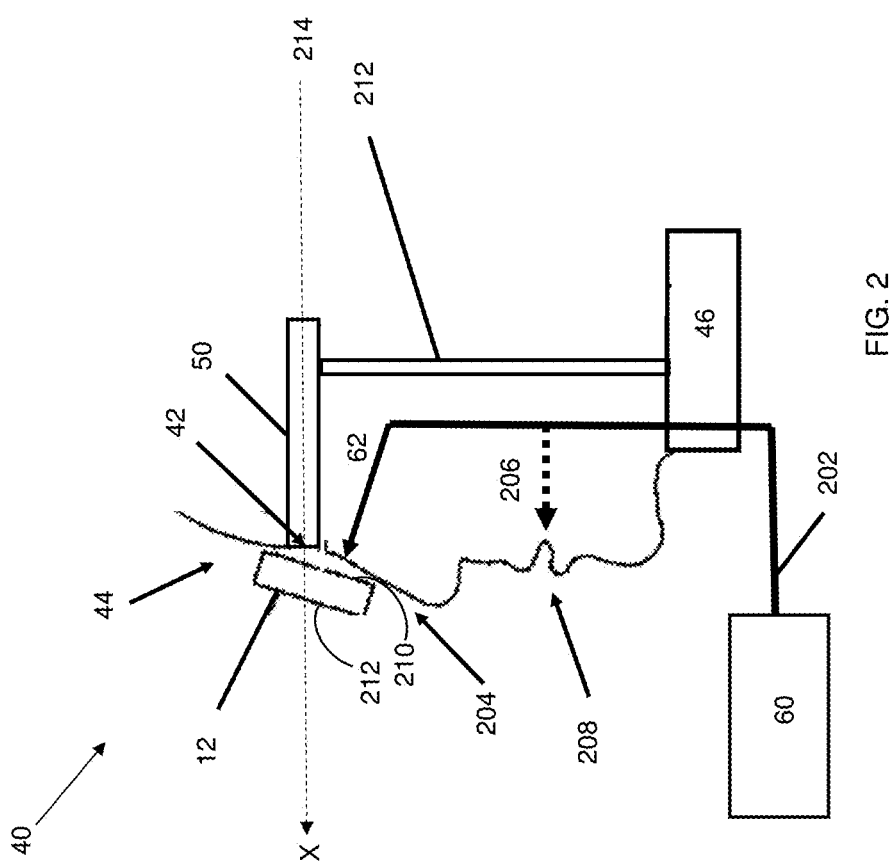
FIG. 2 illustrates a schematic block diagram of an exemplary head form that can be used with the apparatus incorporating aspects of the disclosed embodiments.

FIG. 2 illustrates an exemplary model of a head form 40 incorporating aspects of the disclosed embodiments. The example of FIG. 2 is a cross-sectional view of a partial head form. In this example, the back portion of the head form 40 is not shown.

The head form 40 is configured as an anatomically accurate head form in a shape of a user's head. An opening 42 is formed in the front portion 44 of the head form 40 in a position that is consistent with where the eye of the user would be located. Although only one opening 42 is referred to herein, it will be understood that the head form 40 can include two such openings 42. In one embodiment, the head form 40 may be formed of a nylon material. In alternate embodiments, the head form 40 can be comprised of any suitable material or materials.

As illustrated in FIG. 2, the eyewear 12 to be tested, also referred to herein as the "test eyewear 12", is configured to be mounted on the head form 40. In this manner, the test eyewear 42 is maintained in a generally anatomically correct position on the head form 40, and in a manner that is generally consistent with how the test eyewear 12 would be worn by a user during normal use.

Referring again to FIG. 1, the head form 40 is mounted on a bottom member or surface 26 of the chamber 20. In one embodiment, a supporting member 46 can be disposed between the bottom surface 26 of the chamber 20 and the head form 40. The supporting member 46 can be configured to enable adjustment of the vertical and horizontal positioning of the head form 40 within the chamber 20. For example, in one embodiment, the supporting member 46 can be suitably sized to vary or adjust the height of the head form 40 within the chamber 20 relative to the target image 24. In one embodiment, the supporting member 46 is a plastic block. In alternate embodiments, the supporting member 46 can be comprised of any suitable material that can be accommodated in the environmentally controlled chamber 20.

FIG. 2 illustrates an example of how the flow 62 of warm moist air from the humidifier device 60 can be delivered. In this example, a supply tube 202 is connected to the humidifier device 60. The warm moist air exits out of the tube 202 and into the eye openings 42 in the head form 40. The eye openings 42 allow the flow 62 to enter an area or region 204 generally between a rear side 210 or surface of the test eyewear 12 and a frontal or face portion 44 of the head form 40. In one embodiment, the eye openings 42 are approximately 1 inch diameter openings in the head form 40.

In one embodiment, referring to FIG. 2, the head form 40 can optionally include a secondary warm moist air supply 206. In this optional embodiment, the supply tube 202 can include another connection or secondary supply tube 206 that is configured to deliver a flow of the warm moist air to an outlet or opening 208 in the head form 40. In the example of FIG. 2, the outlet 208 is configured as the mouth opening of the head form 40. In this manner, the test setup can be configured to replicate how the breathing of a wearer through the mouth may cause the eyewear to fog. This secondary delivery of warm moist air through outlet 208 can be used alone, or in combination with the primary delivery of warm moist air through eye opening 42. For example, in one embodiment, the supply tube 206 can be directly connected to the humidifier device 60, rather than as a split off of the supply tube 202.

As will be described further herein, the camera device 50 is mounted in the head form 40 of the apparatus 10. The camera 50 is configured to record the as-worn view of the target image 24 through the test eyewear 12 to allow measurement of the anti-fog effectiveness. In one embodiment, the camera 50 is a charge-coupled device (CCD). In alternate embodiments, the camera 50 is any suitable imaging device, other than including a CCD device. As one example, in one embodiment, the camera 50 is a video recorder.

In the example of FIG. 2, the camera 50 is disposed on the supporting member 46, also referred to as a mount. The supporting member 46 is configured to dispose the camera 50 within the chamber 20 so that the viewer and imaging optics of the camera 50 are inline or aligned with the eye opening 42 of the head form 40 and facing the target image 24. For example, in one embodiment, the viewer of the camera 50 is aligned along an approximate centerline 214 of the eye opening 42. In this example, the viewing direction is shown as viewing direction X. In one embodiment, the supporting member 46 is adjustable and is configured to enable the positioning of the camera 50 along the centerline 214 of the eye opening 42.

Although only one camera 50 is referred to herein, in one embodiment, the aspects of the disclosed embodiments can include two cameras. For example, one camera 50 can be disposed with respect to each of the eye openings 42 as is generally described herein.

During fog testing of the eyewear 12, the apparatus 10 is configured to cause the eyewear to fog up. During the testing process the camera device 50 is configured to detect the fogging by capturing images of the image target 24. As the camera 50 records the image target 24 during the testing as is described herein, in one embodiment, analysis software running on the computing device 70 is configured to calculate the contrast ratio difference between the white background of the image target 24 and the black resolution bars of the image target 24. This contrast ratio is plotted against known Haze Calibration standards recorded imaged to track the anti-fog performance. This provides a performance measure of the anti-fogging device. A passing performance is considered a contrast ratio score that stays below the interpolated 7% Haze standard. Commercially available Haze Standards are sold as 5% and 10% ratings, and thus an interpolation must be made for the previously determined 7% Haze failure point.

Figure 3:
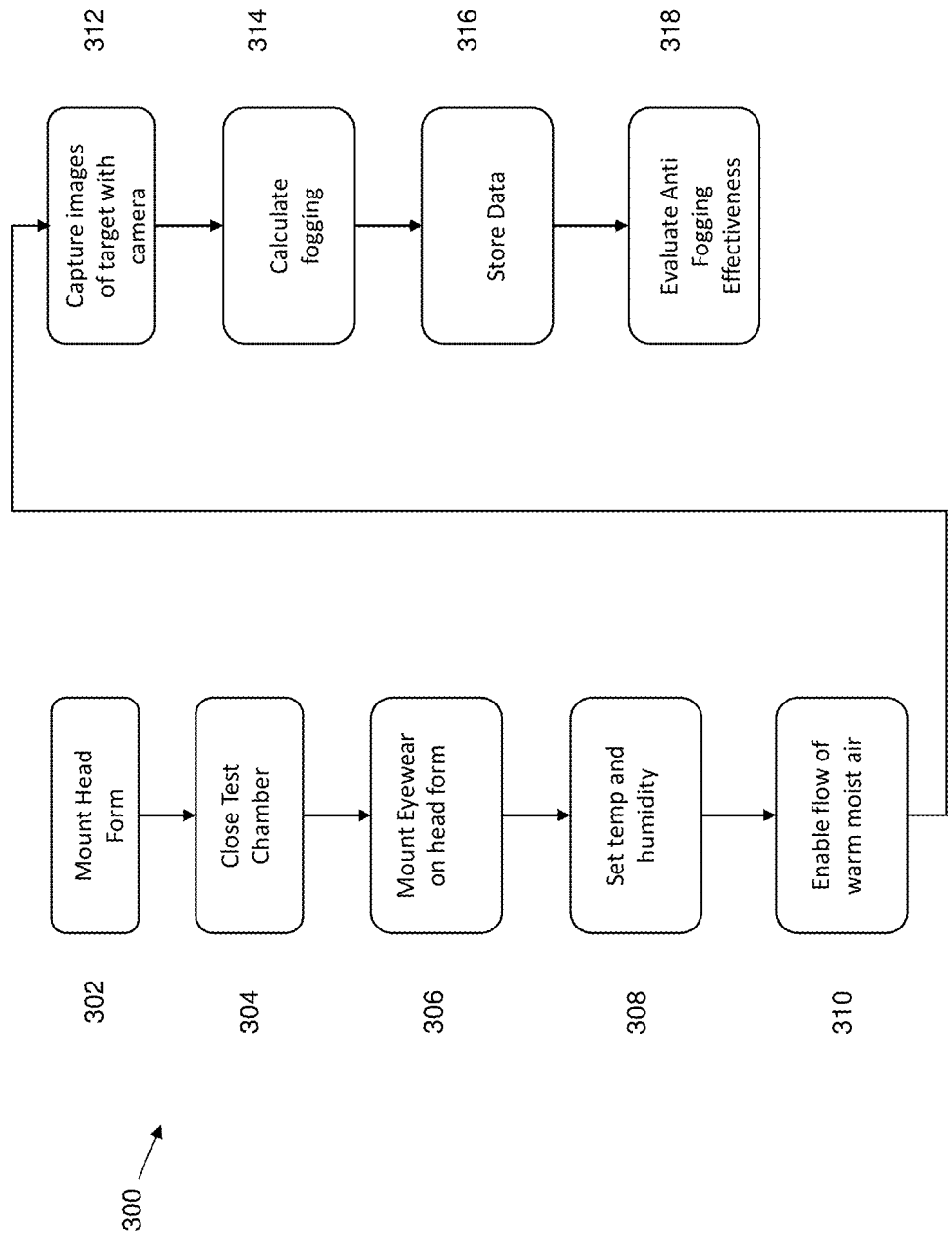
FIG. 3 is a flow chart illustrating a testing process incorporating aspects of the disclosed embodiments.

FIG. 3 illustrates a flowchart of an exemplary eyewear fog testing process 300 incorporating aspects of the disclosed embodiments. For testing purposes, the head form 40 is mounted 302 in the test chamber 20 and the test chamber 20 is closed or sealed 304. The eyewear 12 to be tested is mounted 306 on the head form 40, using for example, access door 21.

The temperature and relative humidity of environment within the test chamber 20 is set 308 by the temperature and humidity control assembly 30. In one embodiment, the temperature and humidity control assembly 30 is energized to maintain the interior of the chamber 20 at a temperature in the range of about 10 degrees Celsius to about 12 degrees Celsius. The relative humidity within the chamber 20 can be maintained at less than 30%.

Referring also to FIG. 2, a flow 62 of warm moist air is enabled 310. The flow 62 of warm moist air is directed from the humidifier 60 to the area 204 between the eyewear 12 and the face portion 44 of the head form 40. In this manner, the rear surfaces 210 of the eyewear 12 closest to the face portion 44 of the head form 40 are maintained in a warm moist condition, while the front surfaces 212 of the eyewear 12 are maintained in a cold and moist condition.

The differences in environmental conditions between the front surfaces 212 and the rear surfaces 210 of the eyewear 12 cause the eyewear 12 to fog. As the eyewear 12 "fogs up", the camera 50 is configured to capture 312 images of the target image 24 of FIG. 1. The computing device 70 is configured to receive the images captured by the camera 50 and calculate 314 a degree or extent of fogging. The test duration can be approximately 120 seconds with an approximately 0.5 frame/second capture rate.

The data relative to the extent of fogging of the eyewear 12 can then be stored 316 and the effectiveness of the anti-fogging solution of the eyewear 12 evaluated 318. A passing performance is considered a contrast ratio score that stays below the interpolated 7% Haze standard. Commercially available Haze Standards are sold as 5% and 10% ratings, and thus an interpolation must be made for the previously determined 7% Haze failure point.

The use of the camera 50 to detect the fogging of the eyewear 12 significantly reduces the costs associated with fog testing. Prior testing solutions that make use of direct measurement of Haze require every expensive test equipment setup and configurations. Using the "camera through the eye" approach in accordance with the aspects of the disclosed embodiments can reduce the estimated cost of the test setup by almost two-thirds. For example, an estimated cost of a typical fog testing setup using a hazemeter can be approximately $65,000 to $70,000. The estimated cost of the system and apparatus described herein is estimated at approximately $24,000. In this manner, the aspects of the disclosed embodiments enable the testing and evaluation of both passive and active anti-fogging solutions in a cost effective manner.

Figure 4:
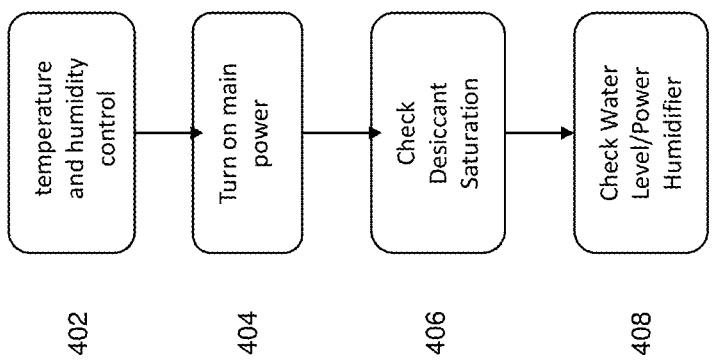
FIG. 4 is a flow chart illustrating a testing process incorporating aspects of the disclosed embodiments.

FIG. 4 illustrates a flowchart of an exemplary pre-testing setup process incorporating aspects of the disclosed embodiments. The process illustrated in FIG. 4 illustrates the initial pre-testing operation steps of the apparatus 10. In one embodiment, approximately four (4) hours prior to use of the apparatus 10 for testing, the temperature and humidity control system 30 is turned on 402. It is desirable to let the temperature and humidity control system 30 run and cool the chamber 20 for at least four hours prior to fog testing. In one embodiment, it is desired for the chamber 20 to reach and be maintained at a temperature setting of 6° Celsius and at a relative humidity level of less than 30%. The temperature and relative humidity settings are configured to optimize the formation of fog on the eyewear 12 during testing.

The main power for the fog tester apparatus 10 is turned on 404. This enables the power circuits for the air pump or fan 36 and the desiccant pump 38 to energize without needing to power on the control computer 70.

A check 406 is made for desiccant saturation. If needed, a used column of the desiccant 38 is switched out for a dry column. The desiccant drying agent such as Drierite™ can be regenerated per instructions, such as bake out in oven at 225° Celsius for 2 hours.

A check 408 is made of the water level of the humidifier device 60. Power to the humidifier device 60 is turned on to allow the water to heat to a temperature of approximately 45° Celsius.

Figure 5:
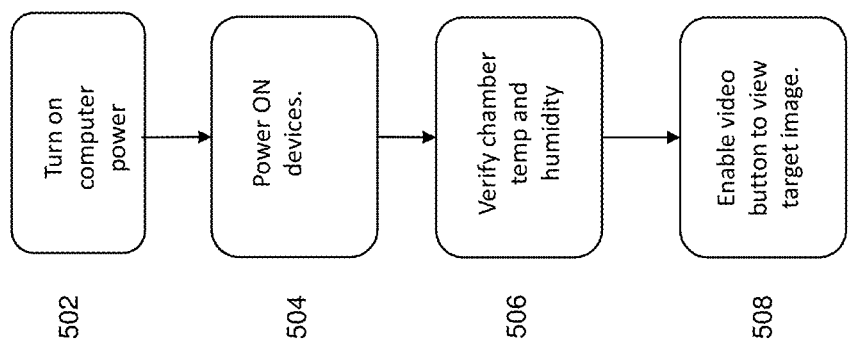
FIG. 5 is a flow chart illustrating a testing process incorporating aspects of the disclosed embodiments.
Figure 9:
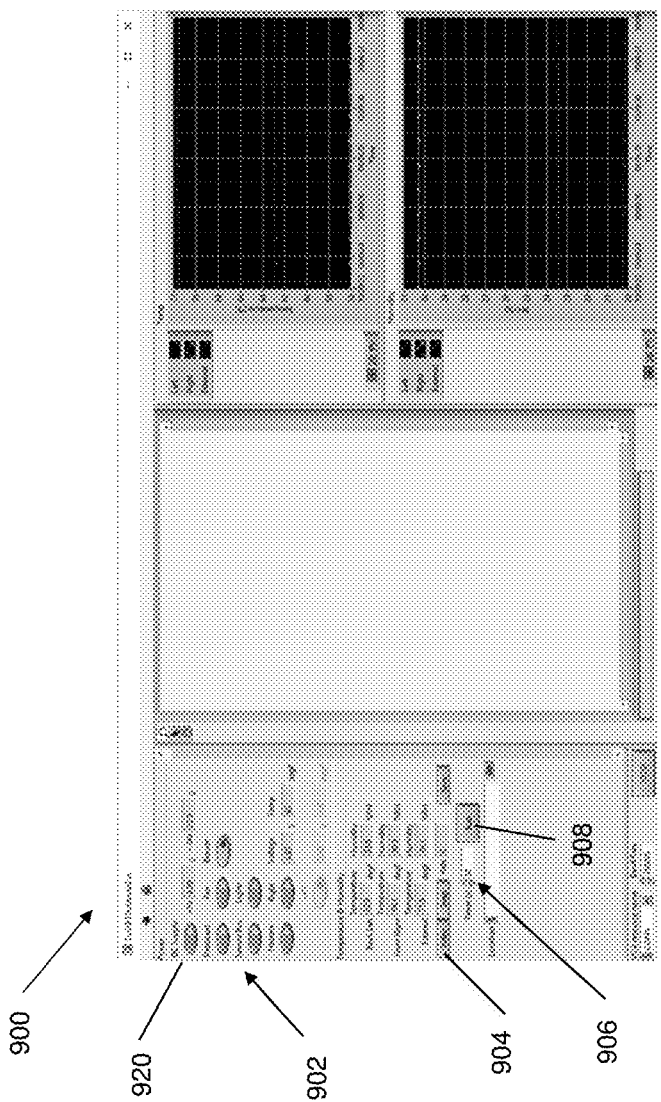
FIG. 9 illustrates an exemplary graphical user interface for a computer application incorporating aspects of the disclosed embodiments.

FIG. 5 illustrates pre-testing operation steps that are implemented approximately thirty (30) minutes before the initiation of an eyewear fog test. In one embodiment, power to the control computer 70 is turned on 502 and the user logs-in with supplied credentials (e.g. username and password). A control program application can be initiated. FIG. 9 illustrates one example of a control program interface 900, also referred to as a graphical user interface (GUI), for a control program application incorporating aspects of the disclosed embodiments.

In one embodiment, power to certain components of the apparatus 10, such as the desiccant 38, blower 36 and fan 64 are powered on 504. FIG. 9 generally illustrates power switches 902 on the control program interface 900 that can be used to control components of the apparatus 10 with respect to FIG. 1. The temperature and humidity levels of the chamber 20 are verified 506.

In one embodiment, referring also to FIG. 9, the video button 904 is enabled 508. An example of the control program user interface 900 with the video button 904 enabled is illustrated in FIG. 10. As shown in this example, enabling the video button 904 activates the camera 50. This provides a view of the target image 24, as captured by the camera 50.

Figure 6:
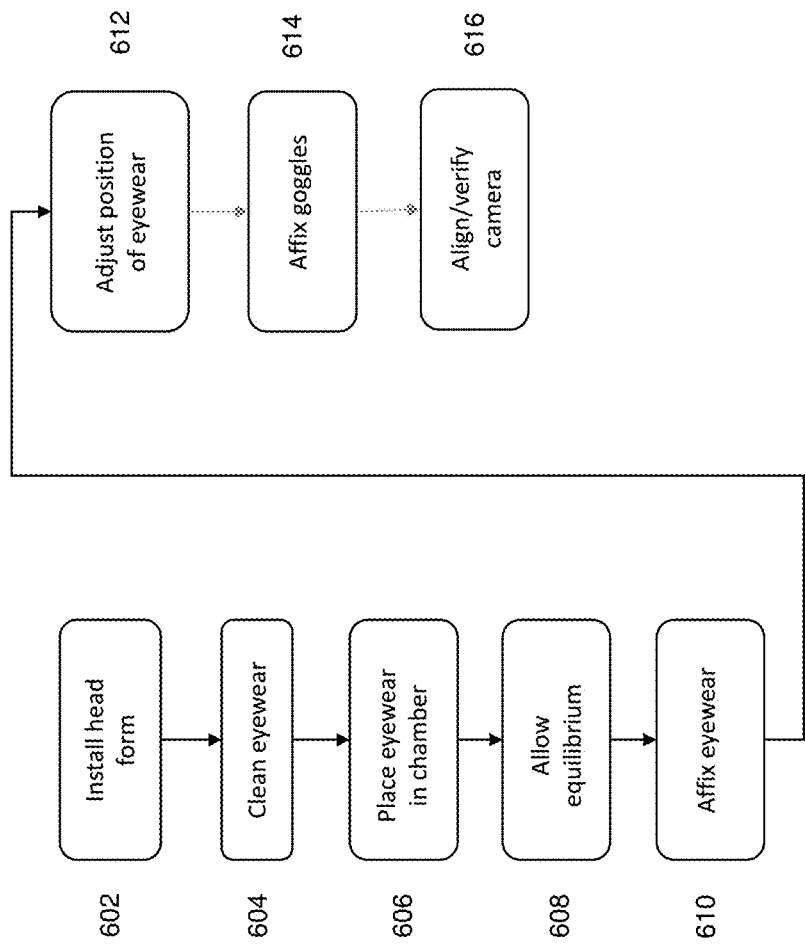
FIG. 6 is a flow chart illustrating a testing process incorporating aspects of the disclosed embodiments.

FIG. 6 illustrates one embodiment of the testing procedure for testing anti-fog eyewear using the apparatus 10. The head form 40 is installed 602 in the chamber 20. This can include installing the head form 40 onto the support member 46 and checking wiring connections if necessary.

Prior to inserting the test eyewear 12 into the chamber 20, it is checked 604 that the lens or lenses of the eyewear is clean and free of debris and fingerprints. The lenses are cleaned with microfiber cloth if needed.

The test eyewear 12 is placed 606 into the chamber 20 via iris ports or an open top 21 of the chamber 20. The test eyewear 12 can be placed on the head form 40, or just within the chamber 20. Approximately 15 minutes is allowed 608 for the test eyewear 12 to equilibrate to the testing conditions and environment of the chamber 20.

In one embodiment, the test eyewear 12 is affixed 610 to the head form 40. In one embodiment, ear posts can be used to affix the eyewear to the head form 40. In alternate embodiments, the eyewear 12 can be affixed or otherwise mounted to the head form 40 in any suitable manner. The eyewear 12 is adjusted 612 to ride in a "normal" position on the "face" or frontal portion 44 of the head form 40. The test eyewear 12 is adjusted such that a full field of view is maintained and no parts of the frame or nose piece of the eyewear 12 are visible in the video images obtained from the camera 50.

In one embodiment, the test eyewear 12 can include a head band or other retaining strap(s). Such straps are typically associated with spectacles, goggles, masks or like devices. The variety of protective eyewear supported by APEL includes spectacles and goggles. In this example, the head band for the eyewear is used to affix 514 the eyewear 12 to the head form 40. The tightness can be adjusted to allow for "normal" positioning of the goggles with respect to the head form, and to fit the goggles to the face of the head form.

The alignment of the eyewear 12 is checked 616 by viewing the camera image readout, such as the image 910 shown in FIG. 10. The image 910 represents the actual image of the target image 24 as viewed from camera 50. The alignment of the eyewear 12 can be adjusted until a full field of view is obtained. This is performed by visual check of the video feed showing the image target as seen in FIG. 10. The apparatus 10 is now ready for fog testing of the test eyewear 12.

As will be described herein, the aspects of the disclosed embodiments are directed to fog testing of both passive eyewear and active eyewear. Active eyewear generally refers to eyewear that includes active devices, such as electronics and heaters, that are used to controlling fogging.

Figure 7:
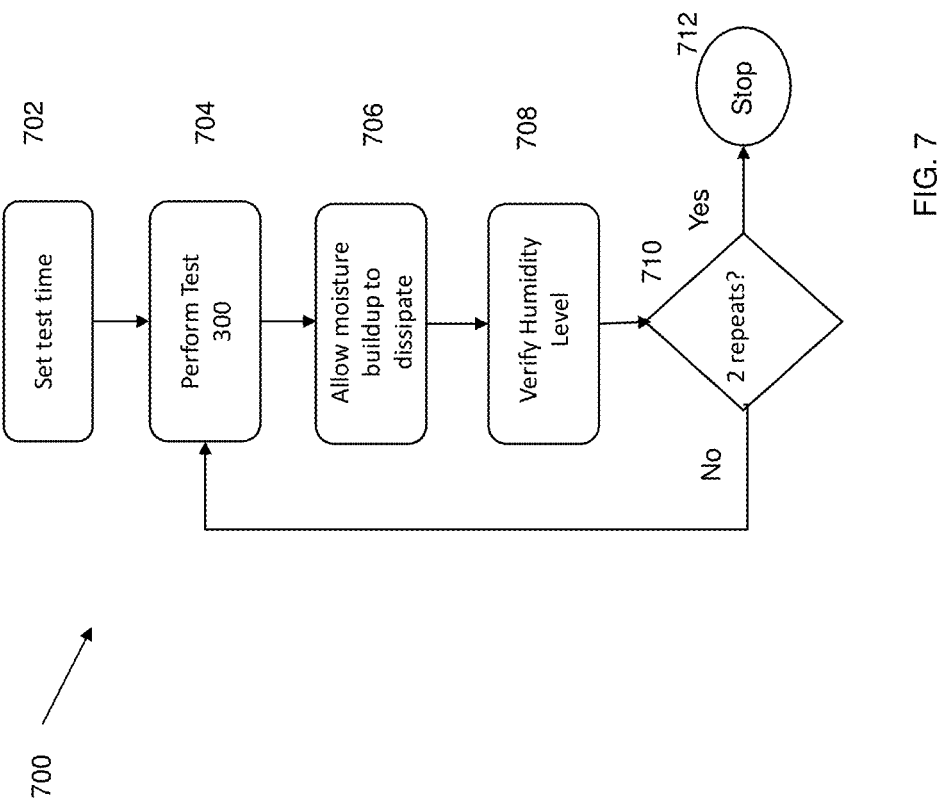
FIG. 7 is a flow chart illustrating a testing process incorporating aspects of the disclosed embodiments.

FIG. 7 illustrates an exemplary anti fog test measurement process 700 incorporating aspects of the disclosed embodiments. The measurement process 700 is a typical test procedure for Passive anti-fog devices. In one embodiment, referring also to the control panel 920 shown in FIG. 9, a timer 906 is used to set or adjust 702 the test time, together with opening a file folder and filename for the test sample data. In one embodiment, a recommended rest time is 60 Seconds (at a 2 frames per second record rate).

The fog test 704 of the eyewear 12 can then be carried out. In this example, the fog test 704 generally comprises the test 300 described with respect to the process of FIG. 3.

To initiate the test 704, in one embodiment, mouse pointer is moved to the "Run" button 908 shown in FIG. 9, and the button 908 selected. In this example, the eyewear 12 is mounted on the head form 40 and the chamber 20 prepared as is described with respect to the process illustrated in FIG. 3.

With reference also to FIG. 3, the camera 50 captures 312 a view of the target image 24, as viewed through the lens of the eyewear 12. Since there is warm moist air flowing across the surface of the lens of the eyewear 12, the eyewear will have tendency to fog.

In the example of FIG. 7, with reference to the process 300 of FIG. 3, the step 314 of calculating the fogging in performing the test 704 comprises calculating a contrast difference between a background and resolution bars of the target image 24 detected by the camera 50 and plotting a contrast ratio from the calculated contrast difference against a known calibration standard. A performance measure of the anti-fog device of the eyewear 12 is then calculated.

Once the test 704 is complete, built up moisture on the lens(es) of the eyewear 12 is allowed 706 to dissipate. In one embodiment, there is a wait time of approximately five (5) minutes to allow the built up moisture on the lens(es) of the eyewear 12 to dissipate. The humidity level in the chamber 20 is verified 708. In one embodiment, the measurement procedure 700 described above is repeated 710 at least two more times. Once the desired number of test repetitions has been completed, the test is stopped 712.

The anti-fog performance of the test eyewear 12 is then recorded. A passing performance is considered a contrast ratio score that stays below the interpolated 7% Haze standard. Commercially available Haze Standards are sold as 5% and 10% ratings, and thus an interpolation must be made for the previously determined 7% Haze failure point. The eyewear 12 can be removed from the head form 40 and the procedure 700 repeated for another test eyewear 12 sample.

Figure 8:
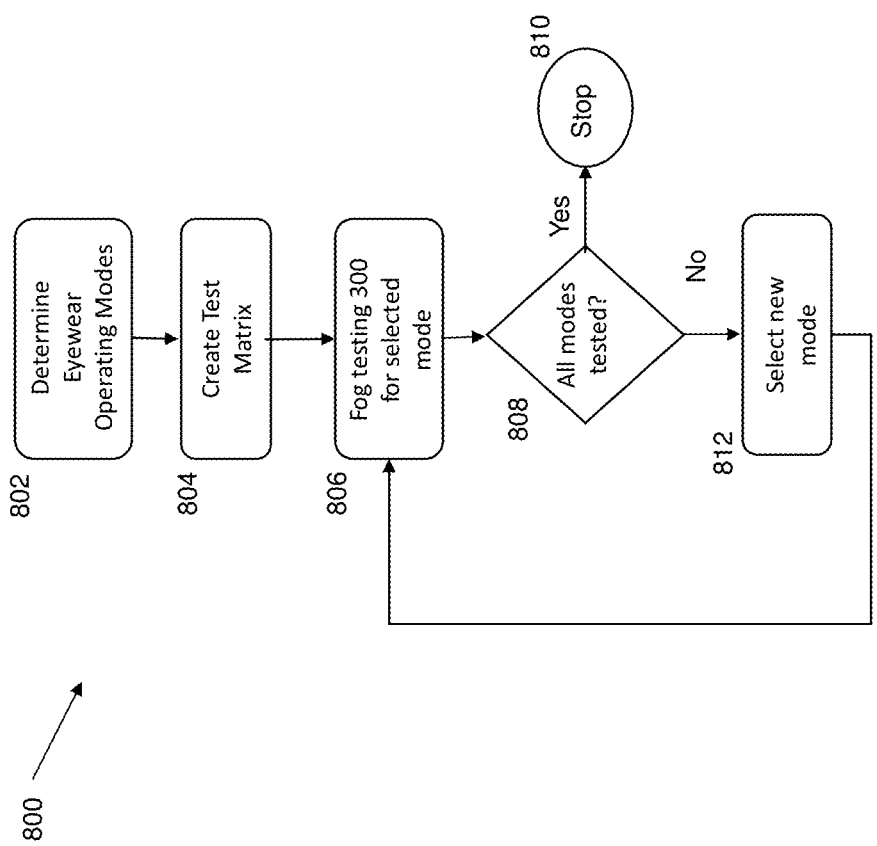
FIG. 8 is a flow chart illustrating a testing process incorporating aspects of the disclosed embodiments.

FIG. 8 illustrates an exemplary test procedure 800 for a test eyewear 12 that includes an active anti-fog device using the apparatus 10 of the disclosed embodiments. In this example, the number of operating modes of the active anti-fog eyewear is determined 802, as well as if inherent passive anti-fog coating is used. A test matrix is created 804 to cover all modes of operation of the active eyewear (i.e. "off", "on-intermittent", "on-constant", etc.)

One example of active mode operating instructions for a possible testing scenario for testing active anti-fog eyewear 12 in accordance with the aspects of the disclosed embodiments can include the following:

1. Off
Passive test Total Test time 60 seconds
2. Always On
Passive test Test to fail (open timed) total test time 10 minutes
3. Heat on Demand:
Active Test, Set Timer for 10 minutes (600 seconds), Start HoD mode and click "Run". Total Test time 10 minutes
4. Running Start, Heat on Demand+Boost mode
Set Timer function for 11 minutes (660 seconds) Active Test, power off allow item to fog for 60 seconds, then apply Heat on Demand+Boost clearing. Total Test time 11 minutes.

It will be understood that each active anti-fog eyewear technology can have different active mode operation parameters. Thus, each active mode operational test, such as that described above will be specific to the particular anti-fog eyewear technology of the eyewear 12. For certain types of active eyewear, there can be a remote trigger cable. The cable if available, can be thread to the test eyewear 42 through an iris glove port or other convenient access point in the test chamber 40. The remote trigger can be used to change active antifog modes of the eyewear 12.

Fog testing 806 is carried out for the particular mode. The fog testing 806 will generally comprise the test process 300 described with respect to FIG. 3. In one embodiment, this includes running a fog test for each operating mode in the matrix of operating modes. It is recommended to perform the "off" mode first and test the active eyewear using the anti-fog test methodology. In one embodiment, each test can be repeated three (3) times for statistical purposes.

It is determined 808 if all modes of the eyewear 12 have been tested. If not, a new mode of the test eyewear is selected 812 and the fog tested 806. If it is determined 808 that all modes are tested, the test can be stopped 810.

For other modes of operation, a "test to fail" may be required. In this example, the operator conducts a test similar to the test 300 described with respect to FIG. 3. However, in this example, except that the air blower 64 is kept on to maintain a constant flow 62 of warm moist air. In the example of FIG. 3, the test would be allowed to run for the described 60 second moist air exposure, at the end of which the moist air exposure is stopped. For a test-to-fail, the warm moist air and image recording is set for some suitably long test time, such as 10 minutes (600 seconds) or until visual fogging is noticed by the operator. The test is stopped manually and the time to fog is then adjusted to run in the automatic data collection fashion as described herein. In this example, data collected until the anti-fog technology is defeated or a predetermined time is met (such as 10 minutes of continuous exposure without any recorded fogging). The antifog technology is considered defeated when visual fogging obscures the video view of the image target.

In one embodiment, the application program associated with the apparatus 10 can include an image analysis portion. A file directory of the sample data desired to be processed is opened. Beginning with the zero time image the analysis boxes are aligned that so each set of bars are within the highlighted field. The images can be scrolled through using the slider function, and the analysis field adjusted to that it is not affected by image drift. The process button can be selected to proceed. The output data is selected and exported for processing program, such as to an Excel2010™ spreadsheet program. Once in the spreadsheet, the date can be saved and processed. In one embodiment, a comparison is performed between the item under test contrast ratio values and the calibration Haze Standard data. The changes in contrast ratio values coincides with the degree of fogging and is compared to the known passing anti-fog performance from Haze meter measurements.

The aspects of the disclosed embodiments are directed to using a video camera for fog testing of eyewear. The use of a video camera through the eye significantly reduces costs as compared to traditional fog testing setups. The test set up and apparatus of the disclosed embodiments is configured to work with both passive anti-fog devices as well as active anti-fog devices. The test eyewear can be evaluated in the as-worn position, which facilitates the evaluation of active anti-fog technologies that may require gravity to help clear the visual field of view or cannot with stand testing conditions as described in existing Test Standards (ASTM F659 Annex 1, ANSI Z-87, or EN168 test standards).

While there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus configured to fog test eyewear, the apparatus comprising:
   an environmentally controlled chamber;
   a head form disposed within the chamber;
   a radiator disposed within the chamber, the radiator connected to a liquid cooling system; and
   a humidifier device configured to deliver a flow of warm moist air towards the frontal portion of the head form and a surface of the eyewear;
   a camera disposed within the head form, the camera aligned with a first opening in a frontal portion of the head form and configured to detect a target image within the chamber while the flow of warm moist air is delivered; and
   a processor, the processor being configured to:
      calculate a contrast difference between a background of the target image detected by the camera and resolution bars of the target image detected by the camera;
      plot a contrast ratio from the calculated contrast difference against a known calibration standard; and
      calculate a performance measure of an anti-fog device of the eyewear.

2. The apparatus according to claim 1, wherein the camera is a CCD camera.

3. The apparatus according to claim 1, wherein the humidifier device comprises a supply tube that extends at least to the first opening in the frontal portion of the head form and is configured to deliver the flow of warm moist air to an inner surface of the eyewear through the first opening in the frontal portion of the head form.

4. The apparatus according to claim 3 wherein the humidifier device comprises a second supply tube, the second supply tube connected to a second opening in the head form beneath the first opening, the second supply tube configured to deliver a second flow of warm moist air to the frontal portion of the head form through the second opening.

5. The apparatus according to claim 1, further comprising a controller connected to the radiator and the humidifier device, wherein the controller is configured to maintain a temperature of the chamber in a range of 5° C. to 12° C. and a relative humidity level of the chamber at less than 30%.

6. The apparatus according to claim 1, wherein calculating the performance measure of the anti-fog device of the eyewear comprises determining a contrast ratio score that is below an interpolated 7% Haze standard.

* * * * *